Patented Nov. 4, 1952

2,616,814

UNITED STATES PATENT OFFICE 2,616,814

COMPOSITION OF CALCIUM SALTS OF TALL OIL AND A METHOD OF MAKING IT

Paul Mahler, New York, N. Y.

No Drawing. Application September 30, 1949, Serial No. 119,015

2 Claims. (Cl. 106—123)

The present invention involves a new water-insoluble calcium soap of tall oil in gel form and of relatively low acidity, which is particularly suitable for use as a film forming composition. It may be used with a pigment, an extender, additional solvent, and if desired, other materials used to make up a paint or other coating composition, or various types of plastics.

The invention involves more particularly the use of these soaps ingredients in a mineral spirits solution with a solubilizing agent. The term "solubilizing agent" as used herein means any material which will make the limed soap sufficiently soluble in the liquid hydrocarbon so that the solution will be homogeneous and there will not be any precipitation or settling of the active ingredients or reaction products; which will not materially change the relative proportions of any of the components which comprise the non-volatile content or film-forming constituents of the solution; and which at the same time will reduce the viscosity of the soap solution to such an extent that the product may be readily worked to prepare a protective coating. One grade of tall oil that has been used consists of about 45% of fatty acids having an acid number of about 200, about 45% of rosin acids having an acid number of about 165 to 180, together with about 10% of unsaponifiable matter. It is to be understood that wherever there is later reference to "tall oil" it includes both the various commercial grades of the natural product and the synthetic product made from an appropriate mixture of fatty acids and rosin acids.

In a preferred embodiment of the invention the process may be carried out as follows, but as will be later pointed out, some of the steps and the sequence of steps may be changed in some particulars.

The acidic natural or synthetic tall oil is first dissolved in a suitable petroleum solvent such as mineral spirits or a mixture of mineral spirits and a suitable solvent of higher boiling point. The relative quantities are preferably such as to form a 40% solution, but the concentration of acids in the solvent solution may be between 20% and 80%, and even higher if there be sufficient solubilizing agent added. The acidic solution is heated to about 65 to 75° C. and then neutralized by the addition of a homogeneous fine slurry of hydrated lime in cold mineral spirits, consisting of 1 part of lime to 3 to 7 parts of solvent. After thoroughly mixing the lime slurry and acid solution, stirring is stopped until a soap of good gel consistency has been formed.

A strong exothermic reaction takes place. If the above directions are followed soap is formed very quickly and the mass rapidly assumes a viscous gel-like consistency. By the time the temperature reaches 80° C. the viscous gel retards the loss of solvent and of the water formed by the reaction. The mass has a muddy, off-color appearance, probably due to the presence of an unreacted impurity. When the muddy appearance has disappeared the reaction is considered to be finished. On cooling, the mass assumes a homogeneous, yellow, gel-like appearance, and the degree of hardness is inversely dependent on the amount of solubilizing agent present.

The amount of hydrated lime used, based on 100% $Ca(OH)_2$, is in excess of that required to form a neutral lime soap. Theoretically, if one started with 100 parts of an acid mixture having an acid value of 165, about 9 parts of hydrated lime would be required to reduce the value to 20. I must use such a large amount of $Ca(OH)_2$ as will give a product containing a substantial amount of basic soap.

There are preferably used about 15 parts of lime to about 100 parts of tall oil. The minimum and maximum amount of lime would be about 10 and 20. The amount of lime used is preferably between 10% to 20% based on the weight of an acid mixture having an acid value of 165. The amount of hydrated lime, based on 100% $Ca(OH)_2$, is about 50% in excess of that required to form the neutral lime soaps. I may use 13.5 parts of pure $Ca(OH)_2$ per 100 parts of tall oil having an acid value of 165.

In making a synthetic acid mixture, the relative amounts of the rosin acids and fatty acids may be changed, and I may use twice as much of the fatty acids as of the rosin acids.

Reacting at a temperature higher than about 65 or 75° C. offers no advantage provided the hydrated lime is thoroughly wetted with solvent. The rapid addition of lime, preferably in the form of a slurry to facilitate rapid and easy transfer, greatly accelerates the velocity of the reaction, giving rise to the formation of a gelled soap and a great deal of heat, the heat of formation of the water of neutralization. The amount of heat should be sufficient to raise the temperature of the mass up to or above the boiling point of water, depending on the efficiency of insulation. Stirring is necessary to get a homogeneous mixture of the lime slurry in the acid solution, but continued agitation will prevent the formation of large soap aggregates of the desired gel structure and result in a darker colored soap of higher acidity. Therefore, after a few seconds stirring is stopped and the reaction is permitted to proceed until a heavy soap gel has formed, which generally takes place in 5 to 10 minutes. Stirring can then be again employed. The mixture is then heated, if necessary, to 105 to 110° C. to drive off the water. Heating should be continued until the mixture loses all traces of muddiness and off-color. The total reaction takes about 30 minutes. It may be desirable not to drive off all of the water, in which case the temperature should be kept below 100° C. The result in either case will be a low acid number, light-colored, water-insoluble gelatinous soap being completely miscible with the solvent in the presence of which the reaction was carried out.

The soap-solvent product obtained in this manner cannot be used as a grinding vehicle or clear varnish, because at room temperature it is a solid or a very viscous gel. In order to reduce its viscosity and still maintain the solids content at say 40%, and obtain a vehicle suitable for grinding pigments, it is necessary to use a solubilizing agent.

The solubilizing agent may be added to the acid mixture before neutralization or after the soap has been formed. As an example, 100 parts of the soap, in a 40% solution, are solubilized by adding at least 3%, and preferably about 4⅓% of a solubilizing agent such as octylene glycol (based on the weight of the acid). Octylene glycol is the trade name given by Carbide and Carbon Chemicals Corporation to its commercial grade of ethyl hexane diol. In a more concentrated solution, a larger percentage of the solubilizing agent is employed. Instead of octylene glycol I may use other suitable solubilizers such as diethylene glycol, triethylene glycol, and ethyl hexane diol, polyethylene glycol. The choice of solubilizing agent used will be influenced by its effects on the flexibility and chemical resistance of the film and odor and cost of the vehicle. In some cases it may be advisable to add the solubilizing agent after the soap is formed.

An additional plasticizer may have to be added when greater flexibility is desired. This may be a bodied or unbodied oil of low acidity, such as bodied or unbodied soya, fish, linseed, dehydrated or straight castor or china-wood oils, also blown oils, or it may be a polybutene, paraffin oil, wax, or any other similar material which is miscible with the solvent and the soap. I may add about 5% of bodied linseed oil, based on the weight of the acids. The product thus obtained contains about 41% of solids, and may be employed in paint formulation.

If natural tall oil is used I prefer the refined product, such for instance as that sold under the trade-name "Facoil C. S.," produced by National Southern Products Corp., and containing approximately 45% rosin acids, 45% fatty acids, and 10% unsaponifiables, and having an acid value of 165. The ratio of the rosin acids and fatty acids may be varied. If the ratio be 1:1, a hard film will be obtained. An increase in the rosin acid gives a harder and more brittle film, but the hardness and brittleness may be reduced by the addition of plasticizer. Increasing the proportion of fatty acids produces a softer film.

To improve adhesion I may add a terpene resin or various other materials, but they should be chemically resistant, light-resistant, water-insoluble, and miscible with any other ingredients which may have been added, as well as with the soap and solvent.

The fatty acids which may be used with the rosin acids may be long chain saturated or unsaturated. The acids which may be used include saturated acids such as myristic, palmitic, stearic and arachidic, or unsaturated acids such as oleic, erucic, elaeostearic, linoleic, linolenic, clupanodonic, ricinoleic, octadecotrienoic and palmitoleic.

Although I prefer to use the hydrated form of lime, it should be noted that I may employ the hydroxides of other metals which form water-insoluble soaps, but preferably only those hydroxides which are white, such as those of magnesium, zinc or aluminum.

In the use of my improved composition, pigment and extender remain in suspension, no driers are required in the flat or semi-gloss finishes, the drying time is very short, 30 to 45 minutes, and the flow shows no curtaining, sagging or other defects. In a room having its walls coated, the odor rapidly disappears due to fast evaporation of the solvent, and the painted surfaces have excellent washability, good abrasion resistance and good flexibility. A second coat may be applied immediately after the first coat is tack-free, i. e., after about 30–60 minutes. Bald spots are easily covered without showing overlap marks.

As compared to present day material used for the same purpose the cost of the vehicle and protective coating are much lower. The manufacturing cost is very low, because the cycle reaction is very short, i. e., about one-half hour.

A typical commercial white flat paint including my composition and made up in accordance with my invention may include:

100 parts of my composition, including 45% of solids
175 parts of titanox RCHT, which contains about 25% titanium oxide and 75% extender
100 parts of extender
44 parts of petroleum solvent Titanox RCHT is a pigment containing about 30% to $TiO_2$ in rutile form and about 70% of anhydrous calcium sulfate, and is marketed by Titanium Pigments Corporation.

To this the user may add such an amount of thinner as may be desired to give the desired brushability.

Having thus described by invention what I claim as new and desire to secure by Letters Patent is:

1. A method of preparing a water insoluble soap in gel form suitable for use as a film forming composition, comprising reacting tall oil and hydrated lime in the presence of mineral spirits and a glycol for solubilizing the soap in the solvent at a temperature of 65° C. to 75° C., the amount of hydrated lime being about 50% to about 100% above that required to produce a neutral soap of the tall oil.

2. A water insoluble soap in gel form and for use as a film forming composition, comprising the reaction product of tall oil and hydrated lime, the amount of the hydrated lime being about 50% to about 100% in excess of that required to produce the neutral soap, and being admixed with mineral spirits and a glycol, the mineral spirits and glycol being in amounts respectively to form a viscous mass in which about 50% to about 100% of the tall oil soap is in the form of basic soap molecules.

PAUL MAHLER.

REFERENCES CITED

The following references are of record in the file of this patent:

UNITED STATES PATENTS

| Number | Name | Date |
|---|---|---|
| 2,318,096 | Quick | May 4, 1943 |
| 2,348,594 | Bernardi | May 9, 1944 |
| 2,367,462 | Farber | Jan. 16, 1945 |
| 2,416,676 | Bernardi et al. | Mar. 4, 1947 |
| 2,439,377 | Bare et al. | Apr. 13, 1948 |
| 2,448,621 | Rice | Sept. 7, 1948 |

FOREIGN PATENTS

| Number | Country | Date |
|---|---|---|
| 369,379 | Germany | Feb. 17, 1923 |
| 563,547 | Germany | Nov. 7, 1932 |